(12) United States Patent
Paulsen et al.

(10) Patent No.: US 9,086,769 B2
(45) Date of Patent: Jul. 21, 2015

(54) HIGH RESOLUTION NON-GHOSTED GESTURES

(75) Inventors: Keith L. Paulsen, Centerville, UT (US); Michael D. Layton, Salt Lake City, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 292 days.

(21) Appl. No.: 13/571,077

(22) Filed: Aug. 9, 2012

(65) Prior Publication Data

US 2013/0201147 A1    Aug. 8, 2013

Related U.S. Application Data

(60) Provisional application No. 61/521,470, filed on Aug. 9, 2011.

(51) Int. Cl.
*G06F 3/044* (2006.01)
*G06F 3/041* (2006.01)
*G06F 3/0488* (2013.01)

(52) U.S. Cl.
CPC ............. *G06F 3/044* (2013.01); *G06F 3/0418* (2013.01); *G06F 3/04883* (2013.01); *G06F 2203/04808* (2013.01)

(58) Field of Classification Search
None
See application file for complete search history.

(56) References Cited

U.S. PATENT DOCUMENTS

2010/0039405 A1*  2/2010  Chen et al. ............... 345/174
2010/0177059 A1*  7/2010  Wang et al. .............. 345/174
2010/0328262 A1*  12/2010  Huang et al. ............. 345/174

* cited by examiner

*Primary Examiner* — David D Davis
(74) *Attorney, Agent, or Firm* — Morriss O'Bryant Compagni, PC

(57) ABSTRACT

A method of performing a two-finger gesture when the absolute position of the fingers does not need to be known in order to perform the gesture. A touch sensor may provide a false or ghosted position and a real position for each actual finger on the touch sensor. The real position for each finger is located by finding a strongest signal when performing a short aperture measurement relative to one side of the touch sensor so that the direction of a rotation gesture can be determined. The position of fingers in single finger and multi-finger gestures may be determined using de-ghosted weighted average and weighted absolute deviation calculations.

21 Claims, 4 Drawing Sheets

US 9,086,769 B2

HIGH RESOLUTION NON-GHOSTED GESTURES

CROSS REFERENCE TO RELATED APPLICATIONS

This document claims priority to and incorporates by reference all of the subject matter included in the provisional patent application Ser. No. 61/521,470, filed Aug. 9, 2011.

BACKGROUND OF THE INVENTION

1. Field of the Invention

This invention relates generally to touchpad technology. More specifically, the present invention enables the use of multi-finger gestures where the exact absolute position of fingers does not need to be known in order to perform the gesture.

2. Description of Related Art

There are several designs for capacitance sensitive touchpads. One of the existing touchpad designs that can be modified to work with the present invention is a touchpad made by CIRQUE® Corporation. Accordingly, it is useful to examine the underlying technology to better understand how any capacitance sensitive touchpad can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing. Either design will enable the present invention to function.

BRIEF SUMMARY OF THE INVENTION

In a preferred embodiment, the present invention is a method of performing a two-finger gesture when the absolute position of the fingers does not need to be known in order to perform the gesture. A touch sensor may provide a false or ghosted position and a real position for each actual finger on the touch sensor. The real position for each finger is located by finding a strongest signal when performing a short aperture measurement relative to one side of the touch sensor so that the direction of a rotation gesture can be determined. The position of fingers in single finger and multi-finger gestures may be determined using de-ghosted weighted average and weighted absolute deviation calculations.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow. It should also be understood that the terms "touch sensor", "touchpad", "touchscreen", "touch input device" and "touch sensitive device" may be used interchangeably throughout this document.

The measurements used in tracking multi-finger gestures can come from single-ended axis measurements from 1) CIRQUE® Corporation touchpad circuitry or 2) from balanced measurements described in pending U.S. patent application Ser. No. 12/855,545. However, these methods result in a ghosted image when multiple fingers are in contact with the touchpad.

Accordingly, the purpose of the present invention is to enable the user to perform non-ghosted gestures including flick, pinch and rotate. The present invention assumes that at least two fingers are present to perform the gestures to be described. The method of the present invention is well suited for applications where high resolution gestures without ghosting is desirable, and the absolute position of the each finger is not important to performance and recognition of the gesture. In other words, it is not necessary to know precisely where the fingers are located as long as the distance between the fingers may be known, and the position of the fingers is known relative to each other.

For this document, a flick gesture is defined as at least two fingers being rapidly moved together in the same direction in a light, sharp, jerky stroke or movement, a pinch is the bringing together or moving apart of two fingers, and a rotate is movement of at least two fingers around a common center.

One of the steps that may be performed by the present invention is the de-ghosting of the touchpad. Because of the nature of how mutual capacitance touchpads take measurements, when multiple fingers are on a touchpad, each finger can appear to be located in one of two different positions, or a real and a false position. The present invention provides a simple and quick method for determining the actual or real positions of the fingers 42. If the actual positions are known, then the rotate gesture can be performed.

Figure 1:
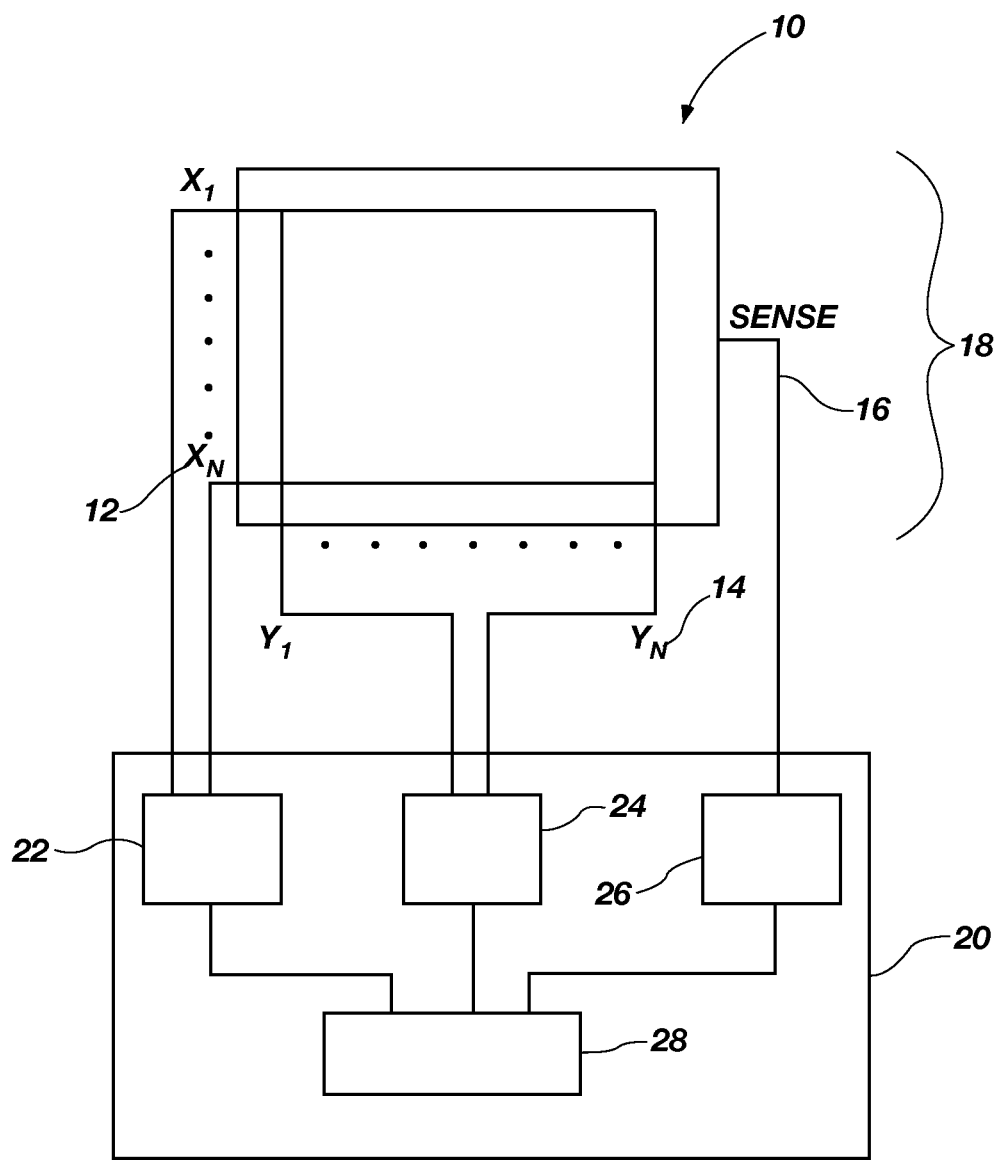
FIG. 1 is a block diagram of the components of a capacitance-sensitive touchpad as made by CIRQUE® Corporation and which can be operated in accordance with the principles of the present invention.
Figure 2:
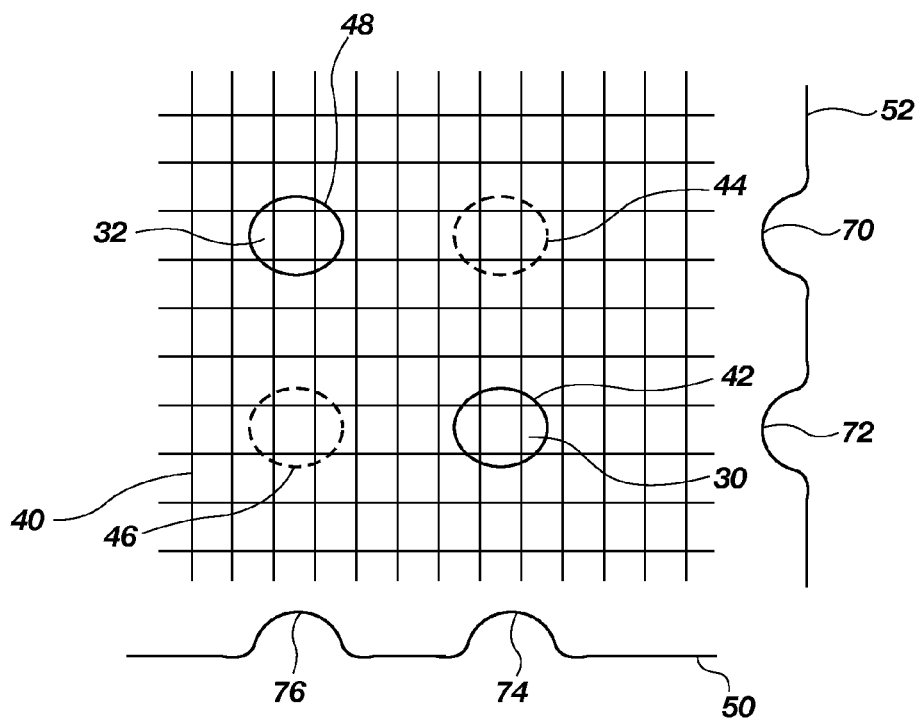
FIG. 2 shows the Ghosting that occurs when using the measurement system as described in pending U.S. patent application Ser. No. 12/855,545.

FIG. 2 shows the ghosting effect that occurs when using the measurement system as described in pending U.S. patent application Ser. No. 12/855,545. As shown in FIG. 2, there are four possible locations for the two fingers 30, 32. These locations are positions 42, 44, 46, 48. This is because the graphs 50 and 52 each show the presence of two fingers at 70, 72, 74 and 76. While visually the actual locations 42, 48 of the fingers 30, 32 are known, the graphs 50, 52 show that the fingers could also be located at positions 44 and 46. This is known as the phenomenon of ghosting.

The step of de-ghosting is performed in order to execute the function of rotation. However, it should be understood that the de-ghosting process can benefit any multi-finger gesture that can be performed. Regarding the rotation function, the direction of rotation can only be performed if the slope of the real fingers can be determined.

In the present invention, de-ghosting is based on determining which of two possible finger positions is real and which is false by analyzing results of a signal that is placed on the electrodes from one side of the touchpad 40. Any edge of the touchpad 40 can be selected for the method. The right edge of the touchpad 40 will be used in the example to follow.

Figure 3:
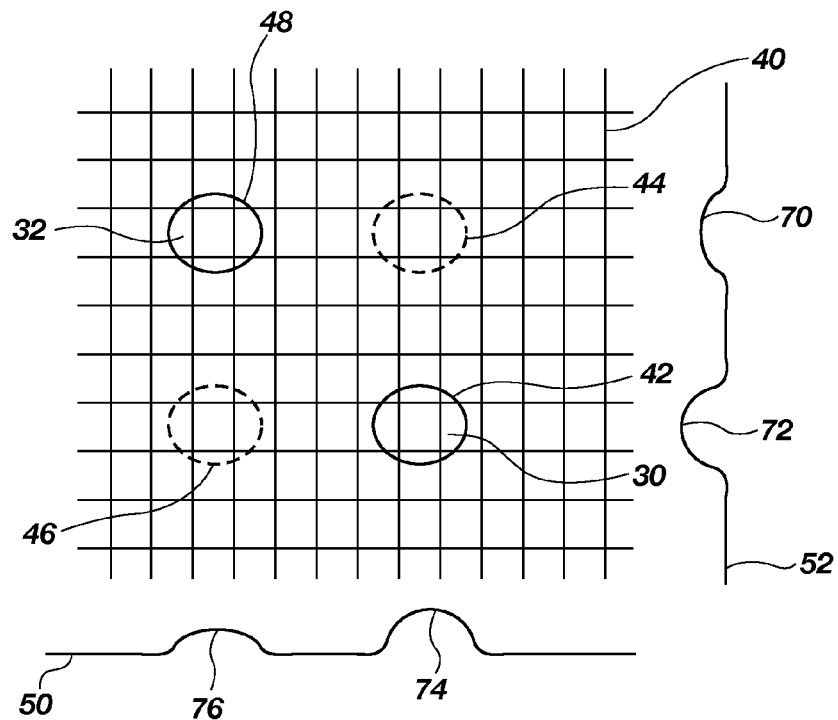
FIG. 3 shows de-ghosted measurements (short aperture) using the method of the present invention.

In FIG. 3, the nearest actual finger to the right side of the touchpad 40 is either at position 42 or 44. The present invention uses a short aperture and a long aperture measurement, or just a short aperture measurement, to determine which of the finger positions is false and which is real.

The graphs 50 and 52 in FIG. 3 are indicative of the strongest signal using whatever measurement system is selected for determining which of the apparent finger positions are real and which are false. Therefore, the graphs 50 and 52 do not specify a specific measurement method that can be used to determine which finger positions are real. However, it is accurate to simplify the results as showing a strong signal for the real position and a weak signal for the false position. The strongest signal in graph 50 is at position 74, and the strongest signal at graph 52 is at position 72.

Figure 4:
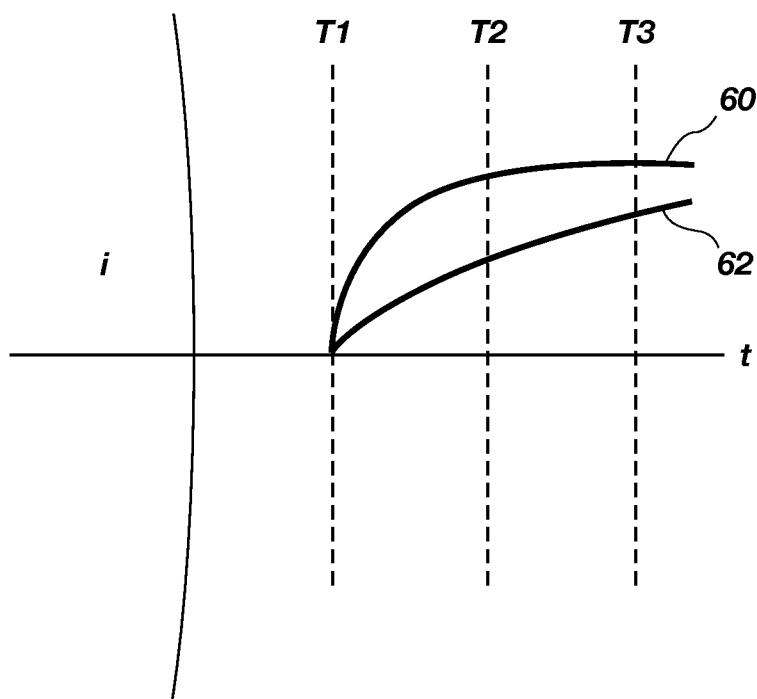
FIG. 4 is a graph showing integrated current graphed as a function of time from short and long aperture measurements.

Consider FIG. 4 which shows a graph of current integrated as a function of time. A signal is applied from the right edge of the touchpad 40 at time T1 and the current is measured at time T2 and at time T3. Time T2 is the short aperture measurement, and time T3 represents the long aperture measurement. When the signal is first applied to the touchpad 40, the current initially rises rapidly and then levels off as the functional equivalent of a capacitor is charged. However, the rate at which the capacitor is charged is a function of the distance of a finger from the right edge of the touchpad 40.

Consider the finger 42 and a signal, such as a square wave, being applied from the right edge of the touchpad 40. If the distance between the finger 42 and the right edge of the touchpad 40 is relatively small, then the integrated current rises rapidly because the resistance from the right edge of the touchpad 40 to the finger 42 is relatively small. The curve 60 represents the integrated current at finger 30. The curve 60 can be characterized as a strong signal that can be shown by the graph 50 at position 72. Notice that the integrated current is almost the same at time T2 and time T3. This is representative of the distance to finger 30 from the right edge of the touchpad 40 being relatively short.

Next, consider curve 62. There is no finger at position 44 because it is actually at position 48. The curve 62 is the resulting integrated current curve for the finger 32 from the right edge of the touchpad 40, and can be characterized as a weak signal as indicated by the graph 50 at position 70. The curve 62 is flattened compared to curve 60, reflecting the increased resistance between the right edge of the touchpad 40 and the finger 32.

The short and large aperture measurements indicate that there is no finger at position 44, and the closest finger to the right edge is at position 42.

The same short and large aperture measurements and integration of current may also be performed from the left, the top or the bottom side or edges of the touchpad 40. However, it should be apparent that this measurement does not have to be performed because the single measurement from only one edge of the touchpad 40 has already indicated the actual positions of the fingers 30, 32.

It should be understood that the touchpad 40 has a first electrode axis which is orthogonal to but co-planar with a second electrode axis, wherein each of the electrode axes are comprised of a plurality of parallel electrodes, wherein one axis functions as drive electrodes while the other axis functions as sense electrodes, and wherein these functions are interchangeable. The set of parallel electrodes that are driven with a signal to perform the de-ghosting process are the set that are pointed at the side from which a signal is driven.

With the de-ghosted actual positions of the fingers 30, 32 now determined, the calculations necessary for executing the desired gestures can now be performed.

Figure 5:
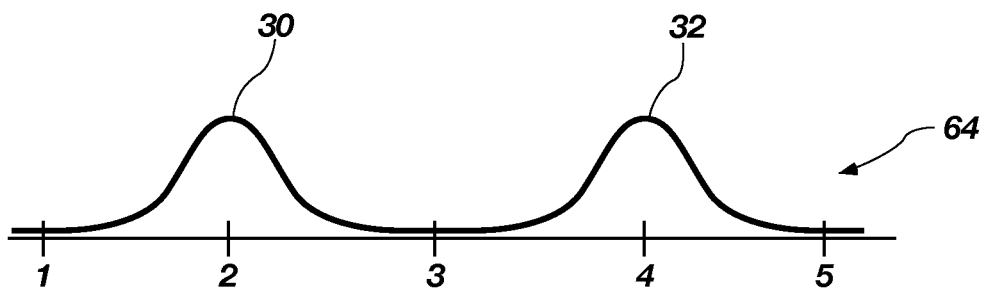
FIG. 5 is a graph showing the concept of a weighted average.

The first step is to determine a weighted average for the fingers 30, 32 on the touchpad 40. The weighted average is a calculation that is well known to those skilled in the art. FIG. 5 is a graph 64 that illustrates the meaning of the weighted average. The locations of the two fingers 30, 32 are on the electrodes 2 and 4. This example is for illustration purposes only, and is not limiting to actual electrodes or the spacing between them, or any prior examples. The weighted average will give a value of the 3 as expected. For the set of axis measurements, x(i)={x(1), x(2), x(3) . . . }, where (i) is the number of the electrode, the weighted average is calculated as $$W(Avg)(x) = \frac{1}{n} * \Sigma i * x(i).$$

Figure 6:
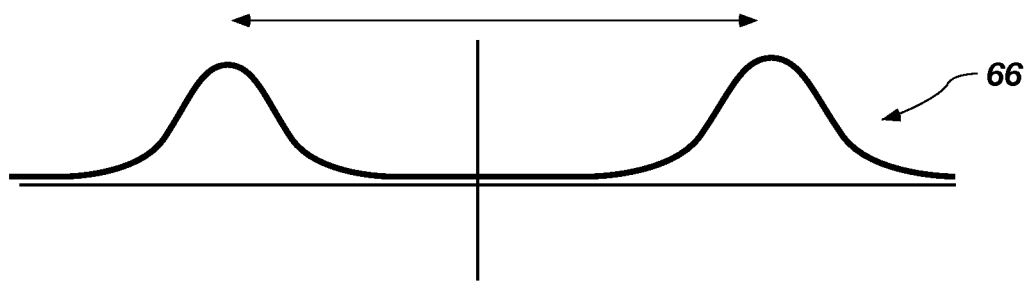
FIG. 6 is a graph showing the concept of a weighted absolute deviation.

The next step is to calculate the weighted absolute deviation (WAD). FIG. 6 is a graph 66 that illustrates the meaning of the weighted absolute deviation. For the set of axis measurements x(i) {x(1), x(2), x(3) . . . }, where (i) is the number of the electrode, the weighted absolute deviation is calculated as $$WAD(x) = \frac{1}{n} * \Sigma |i - W(Avg)| * x(i).$$

The weighted absolute deviation from the weighted average of the X and Y axis measurements are used to determine approximate finger separation with a high degree of precision. The weighted average and the weighted absolute deviation may be used in all of the gesture calculations as explained below.

The following assumptions should be made when performing the gestures to be described. M1X and M2X are the set of two successive X axis measurements. M1Y and M2Y are the set of two successive Y axis measurements. M3X and M3Y are subsequent short aperture measurements. Position(X or Y) can range from (0,0) to (XMax, YMax). Flick(X or Y) can range from (-XMax, -YMax) to (XMax, YMax). Pinch(X or Y) can range from (0,0) to (XMax, YMax). Rotate=-90 degrees to 90 degrees.

The following equations are used for the following gestures for the fingers 30, 32:

PositionX=MaxX*W(Avg)(M1X)

PositionY=MaxY*W(Avg)(M1Y)

FlickX=MaxX*(W(Avg)(M2X)-W(Avg)(M1X))

FlickY=MaxY*(W(Avg)(M2Y)-W(Avg)(M1Y))

PinchX=MaxX*WAD(M1X)

PinchY=MaxY*WAD(M1Y)

Rotate=InverseTangent(SlopePN*WAD(M1Y)/WAD(M1X)),

Where SlopePN=+1 when W(Avg)(M3X)<W(Avg)(M1X), otherwise SlopePN=-1

It should now be apparent that the short and long aperture measurements or just a short aperture measurement quickly determines the slope of the fingers as well as which finger positions are real and which are false, thereby providing the slope data needed to determine the direction of rotation of the fingers.

In an alternative embodiment, the finger locations can be determined based upon a width calculation.

One XY touchpad measurement algorithm generates an XY array of results which vary in magnitude according to the amount of finger presence near the corresponding XY grid location. In such a system, the location of a single touch can be computed as a weighted average. Each result is weighted by the distance from some arbitrarily determined origin, such as the corner of a touchpad. All such weighted results are summed, then this sum is divided by the sum of the results. This gives a position for a finger that is independent of touch strength.

When two touches or fingers are present, the algorithm above can still be used, but it still returns one position, which is the average position of the two fingers. The actual positions of the two fingers can be determined with an additional calculation. Weighted averages are recalculated, but this time, the results are weighted according to the distance from the average location that was determined above. This result gives a measure of how wide the position is. Specifically, results near the average position contribute a small amount to the width, and results far from the average position contribute a large amount to the width calculation. Finally, the two positions can be determined as being at the average position plus and minus half the width. A small width indicates that the touch is only a single finger. Conversely, a two finger touch results in a larger width.

It should be understood that in the description above, distances, including width and positions, all have both an X and a Y component.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for performing a two-finger gesture on a touch sensor, said method comprising:
    1) providing a touch sensor that suffers from the effect of ghosting that provides a false position and a real position for each actual finger on the touch sensor;
    2) performing a de-ghosting operation to distinguish between the false position and the real position for each finger on the touch sensor, said de-ghosting operation comprised of:
        a. performing a short aperture measurement from a first edge of the touch sensor;
        b. selecting the real position of the finger as the strongest signal from the short aperture measurement; and
    3) performing a two-finger gesture using the real position for each finger on the touch sensor.

2. The method as defined in claim 1 wherein the method further comprises providing a touch sensor having a first electrode axis which is orthogonal to but co-planar with a second electrode axis, wherein each of the electrode axes are comprised of a plurality of parallel electrodes, wherein one axis functions as drive electrodes while the other axis functions as sense electrodes, and wherein these functions are interchangeable.

3. The method as defined in claim 1 wherein the method further comprises:

1) performing a short aperture measurement and along aperture measurement from the first edge of the touch sensor; and
2) selecting the real position of the finger as the strongest signal from the short aperture measurement and the long aperture measurement.

4. The method as defined in claim 1 wherein the method further comprises calculating an integrated current curve for each signal coming from the first edge of the touch sensor, and selecting the curve with the highest curve as the strongest signal.

5. The method as defined in claim 1 wherein the method further comprises selecting the two-finger gesture from the group of two-fingers gestures comprised of flick, pinch and rotate.

6. The method as defined in claim 5 wherein the method further comprises performing the two-finger gestures by calculating the weighted average and the weighted absolute deviation, wherein the weighted average is calculated by the equation:

$$W(Avg)(x) = \frac{1}{n} * \Sigma i * x(i),$$

where (i) is the number of the electrode, and wherein the weighted absolute deviation is calculated by the equation:

$$WAD(x) = \frac{1}{n} * \Sigma |i - W(Avg)| * x(i),$$

where (i) is the number of the electrode.

7. The method as defined in claim 6 wherein the method further comprises performing a flick gesture using the equations:

FlickX=MaxX*(W(Avg)(M2X)−W(Avg)(M1X))

FlickY=MaxY*(W(Avg)(M2Y)−W(Avg)(M1Y))

wherein M1X and M2X are a set of two successive X axis measurements, and M1Y and M2Y are the set of two successive Y axis measurements.

8. The method as defined in claim 6 wherein the method further comprises performing a pinch gesture using the equations:

PinchX=MaxX*WAD(M1X)

PinchY=MaxY*WAD(M1Y)

wherein M1X and M2X are a set of two successive X axis measurements, and M1Y and M2Y are the set of two successive Y axis measurements.

9. The method as defined in claim 6 wherein the method further comprises performing a rotate gesture using the equation:

Rotate=InverseTangent(SlopePN*WAD(M1Y)/WAD(M1X)), where SlopePN=+1 when W(Avg)(M3X)<W(Avg)(M1X), otherwise SlopePN=−1 for all other results, wherein M1X and M2X are a set of two successive X axis measurements, M1Y and M2Y are the set of two successive Y axis measurements, and wherein M3X and M3Y are subsequent short aperture measurements.

10. The method as defined in claim 6 wherein the method further comprises performing a position determination of each finger using the equations:

PositionX=MaxX*W(Avg)(M1X)

PositionY=MaxY*W(Avg)(M1Y)

wherein M1X and M2X are a set of two successive X axis measurements, and M1Y and M2Y are the set of two successive Y axis measurements.

11. A method for determining the location of at least two objects on a touch sensor when there is a ghost effect, said method comprising:
1) providing a touch sensor that suffers from the effect of ghosting that provides a false position and a real position for each actual finger on the touch sensor;
2) performing a short aperture measurement from a first edge of the touch sensor; and
3) selecting the real position of the finger as the strongest signal from the short aperture measurement.

12. The method as defined in claim 11 wherein the method further comprises performing a two-finger gesture using the real position for each finger on the touch sensor.

13. The method as defined in claim 12 wherein the method further comprises providing a touch sensor having a first electrode axis which is orthogonal to but co-planar with a second electrode axis, wherein each of the electrode axes are comprised of a plurality of parallel electrodes, wherein one axis functions as drive electrodes while the other axis functions as sense electrodes, and wherein these functions are interchangeable.

14. The method as defined in claim 12 wherein the method further comprises:
1) performing a short aperture measurement and along aperture measurement from the first edge of the touch sensor; and
2) selecting the real position of the finger as the strongest signal from the short aperture measurement and the long aperture measurement.

15. The method as defined in claim 12 wherein the method further comprises calculating an integrated current curve for each signal coming from the first edge of the touch sensor, and selecting the curve with the highest curve as the strongest signal.

16. The method as defined in claim 12 wherein the method further comprises selecting the two-finger gesture from the group of two-fingers gestures comprised of flick, pinch and rotate.

17. The method as defined in claim 16 wherein the method further comprises performing the two-finger gestures by calculating the weighted average and the weighted absolute deviation, wherein the weighted average is calculated by the equation:

$$W(Avg)(x) = \frac{1}{n} * \Sigma i * x(i),$$

where (i) is the number of the electrode, and wherein the weighted absolute deviation is calculated by the equation:

$$WAD(x) = \frac{1}{n} * \Sigma |i - W(Avg)| * x(i),$$

where (i) is the number of the electrode.

18. The method as defined in claim 17 wherein the method further comprises performing a flick gesture using the equations:

$$FlickX = MaxX*(W(Avg)(M2X) - W(Avg)(M1X))$$

$$FlickY = MaxY*(W(Avg)(M2Y) - W(Avg)(M1Y))$$

wherein M1X and M2X are a set of two successive X axis measurements, and M1Y and M2Y are the set of two successive Y axis measurements.

19. The method as defined in claim 17 wherein the method further comprises performing a pinch gesture using the equations:

$$PinchX = MaxX*WAD(M1X)$$

$$PinchY = MaxY*WAD(M1Y)$$

wherein M1X and M2X are a set of two successive X axis measurements, and M1Y and M2Y are the set of two successive Y axis measurements.

20. The method as defined in claim 17 wherein the method further comprises performing a rotate gesture using the equation:

$$Rotate = InverseTangent(SlopePN*WAD(M1Y)/WAD(M1X)),$$

where SlopePN=+1 when W(Avg)(M3X)<W(Avg)(M1X), otherwise SlopePN=−1 for all other results, wherein M1X and M2X are a set of two successive X axis measurements, M1Y and M2Y are the set of two successive Y axis measurements, and wherein M3X and M3Y are subsequent short aperture measurements.

21. The method as defined in claim 17 wherein the method further comprises performing a position determination of each finger using the equations:

$$PositionX = MaxX*W(Avg)(M1X)$$

$$PositionY = MaxY*W(Avg)(M1Y)$$

wherein M1X and M2X are a set of two successive X axis measurements, and M1Y and M2Y are the set of two successive Y axis measurements.

* * * * *